United States Patent [19]

Heath

[11] Patent Number: 5,638,374

[45] Date of Patent: Jun. 10, 1997

[54] ENHANCED TRANSACTION RESERVATION

[75] Inventor: Robert G. Heath, San Diego, Calif.

[73] Assignee: Hughes Electronics, Los Angeles, Calif.

[21] Appl. No.: 404,850

[22] Filed: Mar. 15, 1995

[51] Int. Cl.$^6$ .............................. H04J 3/16; H04B 7/212
[52] U.S. Cl. .................... 370/322; 370/329; 370/348; 370/443; 370/458
[58] Field of Search ................... 370/95.3, 95.1, 370/85.7, 99, 94.1, 110.1; 342/353, 352; 455/121

[56] References Cited

U.S. PATENT DOCUMENTS

| | | | |
|---|---|---|---|
| 4,736,371 | 4/1988 | Tejima et al. | 370/95 |
| 5,197,125 | 3/1993 | Engel et al. | 395/200 |
| 5,239,545 | 8/1993 | Buchholz | 370/95.3 |
| 5,280,625 | 1/1994 | Hawarter et al. | 395/200 |

*Primary Examiner*—Douglas W. Olms
*Assistant Examiner*—Matthew C. Phillips
*Attorney, Agent, or Firm*—John T. Whelan; Wanda Denson-Low

[57] ABSTRACT

An method for improved transaction reservation in an Integrated Satellite Business Network. The method includes generating a transaction request message indicating the number of slots needed to transmit a data message. Then, the method includes transmitting the transaction request message to a host terminal, and assigning one or more slots within an inroute to the remote terminal. The method then includes transmitting a transaction assignment message containing the number of slots assigned and which slots were assigned. In response to this assignment, the method includes transmitting at least a portion of the data message during the slots assigned.

5 Claims, 4 Drawing Sheets

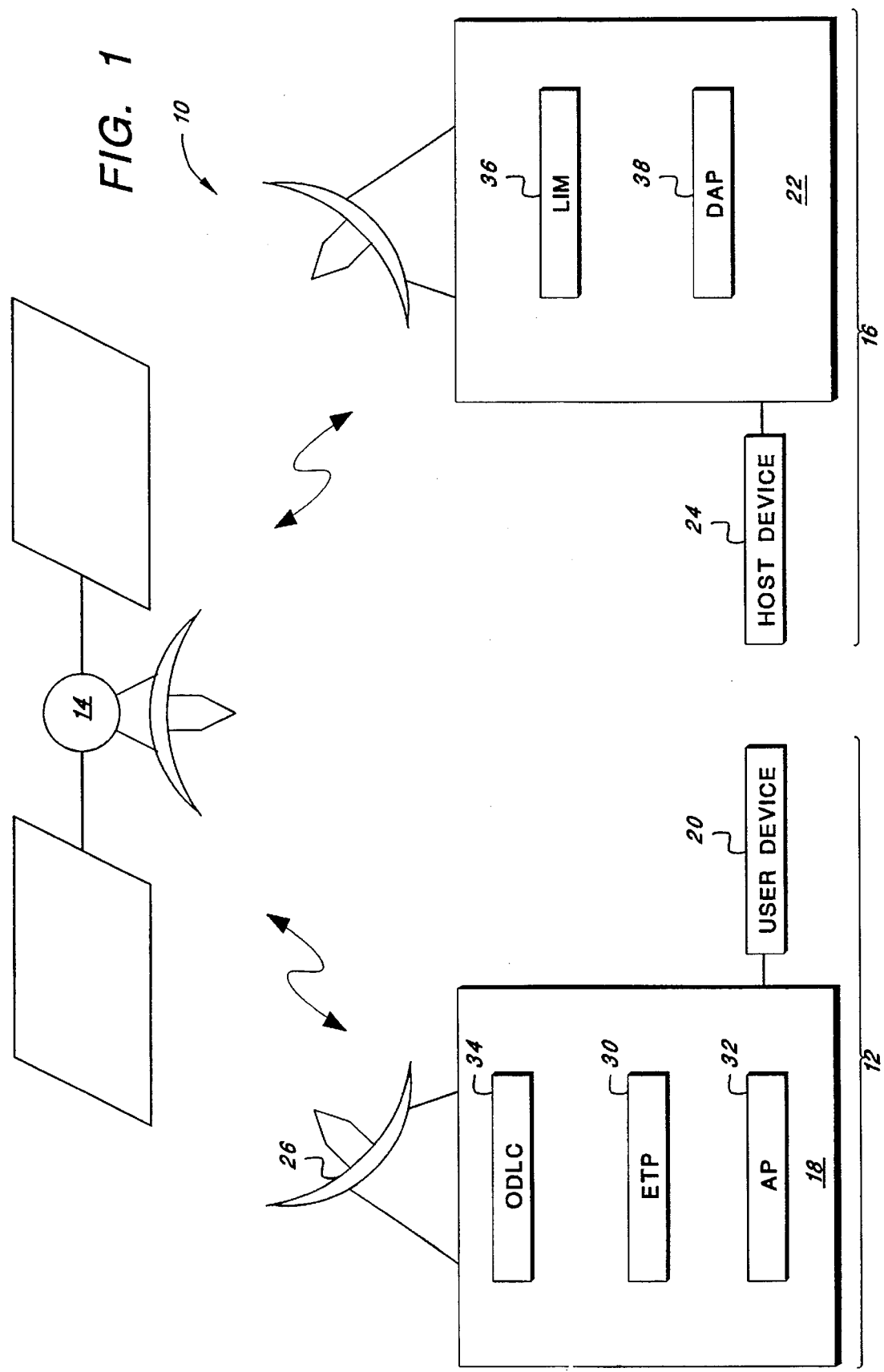

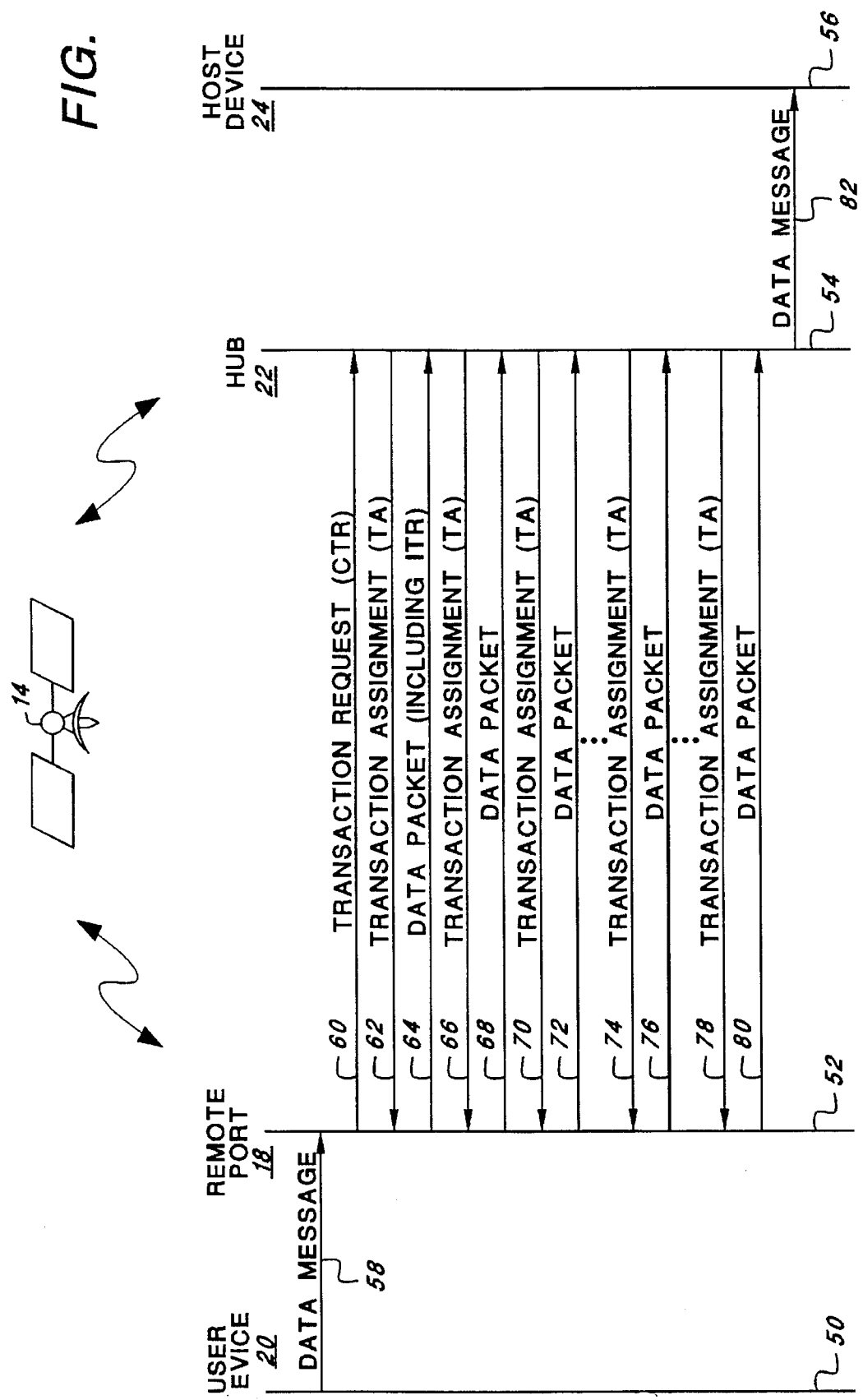

ENHANCED TRANSACTION RESERVATION

BACKGROUND OF THE INVENTION

The present invention relates to improvements in transaction reservation in an integrated satellite business network.

Transaction reservation is one of the methods used in an Integrated Satellite Business Network (ISBN) to transfer data from a remote network interface (or remote port card) to a host network interface (or hub) over a space link via an inroute. The spacelink employs an air communications channel from the remote network interface to an earth orbit satellite, the earth orbit satellite, and another air communications channel from the earth orbit satellite to the host network interface. An inroute is divided into 45 ms intervals called frames, which are divided into slots. The number of slots per frame and the size of each slot depends upon the frequency used to transmit through the inroute. A 128 Kbps inroute has 90 slots, with each slot having 8 bytes. A Demand Assignment Processor (DAP) within the host network interface allocates inroute frame bandwidth to the remote network interface in a continuous group of slots called a burst.

The remote network interface is coupled to a user device, such as a personal computer, a mini computer, or a dumb terminal, which together with the remote network interface is referred to herein as a remote terminal. The host network interface is coupled to a host device such as a mainframe computer, which together with the host network interface is referred to herein as a host terminal.

Transaction reservation operates as follows. The remote terminal, having one or more data packets to transmit to the host terminal, sends a request to the Demand Assignment Processor. This request indicates the amount of bandwidth, i.e., the number of bytes or packet sizes, required by the remote terminal to transmit each of the queued data packets. The transaction request may include up to twelve packet lengths. If additional data packets are queued, bandwidth for them must be separately requested. The Demand Assignment Processor receives the request and allocates the requested bandwidth in a future inroute frame assuming the requested bandwidth is available during the next thirteen frames, which is the number of frames the Demand Assignment Processor looks ahead. If the requested bandwidth is not available within the next thirteen frames, the request is satisfied to the extend possible, and the remainder of the request is disregarded. The remote terminal must re-request bandwidth for which no assignment is made. The Demand Assignment Processor sends a point-to-point message to the remote terminal indicating the inroute frame number and location within the frame that has been assigned to the remote terminal for transmission of the queued data packets. A separate point-to-point message is sent to each remote terminal receiving a transaction reservation assignment.

As mentioned above, typically, the Demand Assignment Processor looks ahead over the next 13 frames, and allocates frames within the 13 frames on a first come first serve basis according to the requests received from the remote terminals. AS also mentioned above, if a remote terminal requests, e.g., ten data packets, which are subsequently assigned to the remote terminal by the Demand Assignment Processor, and another remote terminal also requests ten data packets, only three of the data packets requested by the other remote terminal can be accommodated within the 13 frames of the Demand Assignment Processor's look-ahead. As a result, the Demand Assignment Processor disregards the seven unsatisfied transaction requests and the other remote terminal is forced to re-request bandwidth to transmit the seven of the ten requested packets.

In a mature (fully utilized) Integrated Satellite Business Network environment, the first ten or so frames of the 13 frames within the Demand Assignment Processor's look-ahead will be full. This is because as the 13-frame look-ahead shifts frame-by-frame in time, empty frames are looked at one at a time, and full frames are transmitted one at a time. By the time two or three empty frames have shifted into view, a request for data packets is received, and the Demand Assignment Processor will allocate these two or three available frames. The requesting remote terminal must then re-request any additional bandwidth needed. As a result, groups of packets larger than two or three frames are accommodated in a piece-meal fashion, which increases the control message overhead otherwise needed to send all of the requested packets.

Control messages in an Integrated Satellite Business Network are transmitted during a portion of the inroute frame referred to as the control aloha component. Individual remote terminals on the Integrated Satellite Business Network randomly select a burst within the control aloha component in which to transmit their request when it becomes necessary for them to transmit a control message to the host terminal. As the control message overhead needed to transmit a group of data packets increases, control message traffic increases on the control aloha component.

When two or more remote terminals randomly select the same burst within the control aloha component in which to transmit a control message, neither of these control messages are received by the host terminal, instead resulting in what is referred to herein as a collision. After sending a control message over the control aloha component, remote terminals initiate a timeout period. In the event an acknowledgment of the control message is not received by the remote terminal within the timeout period, the remote terminal assumes that there has been a collision and resends the control message after randomly reselecting a burst within the control aloha component. As can be seen, as the number of control messages to be sent from the remote terminals increases, the likelihood of two or more of the remote terminals randomly selecting the same control aloha burst in which to transmit a control message increases, thus increasing collisions and further increasing traffic in the control aloha component with resent control messages.

Problematically, because in a mature Integrated Satellite Business Network, only two or three packets can be allocated by the Demand Assignment Processor, as described above, the likelihood of a collision on the control aloha portion of the frame becomes increasingly great.

As mentioned above, transaction request messages sent from the remote network interface to the host network interface consist of a string of bytes indicating lengths of the various packets to be sent from a remote network interface to a host network interface. Up to twelve packet lengths can be sent per transaction request sent via control aloha. Slots within the transaction reservation component are assigned to carry the packets, based on the number of slots available within the transaction reservation component, and the packet sizes requested. If the packets to be sent are either too numerous to be assigned, because, e.g., not enough slots remain unassigned to satisfy the request, or because the packets sizes requested will not fit into any remaining slots, the remote network interface must rerequest transaction reservation slots for those packets that cannot be accommodated. Unfortunately, wasted slots may remain unused within the transaction reservation component if none of the packets for which transaction reservations are requested will fit within the unassigned slots remaining within a transaction reservation component.

One limitation on the initial request for transaction reservation slots is that a transaction request message transmitted via control aloha can carry only twelve packet lengths. Thus, only twelve packets can be requested by a remote network interface in a single control aloha transaction request message. When more than twelve packets need to be sent, the remote network interface must either request reservations for the additional packets using an additional control aloha transaction request message, or the remote network interface may signal the host network interface in the control aloha transaction request message that it has additional packets to send. This is done by setting a piggyback request bit within the control aloha transaction request message. In response to this piggyback request bit, the host network interface assigns fifty six bytes (e.g., 7 slots) within the transaction reservation component, in addition to any slots assigned in response to the control aloha transaction request message, for a piggyback transaction request message. The piggyback transaction request message is capable of holding a string of forty-four packet lengths, as opposed to the twelve packet lengths that can be transmitted in the original transaction request message sent via the control aloha. In the event there are still packets to send after those for which slots are requested in the piggyback transaction request message, a piggyback request bit within the piggyback transaction request message signals the host network interface to allocate another fifty-six bytes for another piggyback transaction request message. Slots for such piggyback transaction request messages are always the first slots assigned by the host network, interface before the slots requested, for data packets, so that the piggyback transaction request message can, hopefully, be processed before the packets that follow are all transmitted. Unfortunately, by repeatedly sending piggyback transaction request messages and setting the piggyback request bit, a single remote network interface can effectively "lock up" the entire inroute until all of the packets it has to transmit are sent. If the packets to be sent make up a large, but non-urgent, message, such as a non-urgent data file, more important messages may be delayed due to lock up of the inroute during the transmission of this file.

One parameter that is configured by a network operator in an integrated satellite business network is the Maximum Transaction Size. This parameter defines the largest packet that can be transmitted over the inroute through the transaction reservation component. Typically is desirable that the transaction reservation component be of a size that is evenly divisible by this Maximum Transaction Size, in hopes that many of the packets sent will be of this size. When, for example, sixty slots are allocated to the transaction reservation component, i.e., when there are 480 bytes in the transaction reservation component, the Maximum Transaction Size can be set to 240 bytes. If there are two packets of this size to be transmitted, these packets will fill the entire transaction reservation component, making efficient use of bandwidth. Unfortunately, many of the packets to be sent, including the above-mentioned piggyback transaction request messages, will be smaller than the Maximum Transaction Size, and therefore optimum use of transaction reservation bandwidth will frequently not be achieved.

In heretofore known Integrated Satellite Business Networks, when fast inroutes are utilized, such as 256 Kbps inroutes, the rate with which large multi-packet messages can be transmitted is limited, not only by the availability of slots within the transaction reservation component, but also by the time it takes to request and be assigned slots. For example, when forty-four packets are to be sent on an otherwise unused inroute (having 143 slots in its transaction reservation component), assuming the Maximum Transaction Size is set to 256 bytes and each of the forty-four packets is 256 bytes in length, the transaction reservation components in nine frames will be utilized. However, it takes a period of time equivalent of sixteen frames to request and be assigned these frames. This is because each transaction request takes about seven frames to reach the host terminal, in about one or two frames to be processed by the host terminal and for a transaction assignment to be made, and about seven frames for the transaction assignment to reach the remote terminal. Thus, about sixteen frames for the needed slots to be requested and assigned. Because the initial transaction request made by the remote terminal is limited to requesting twelve packet lengths, even if these twelve packets are immediately allocated slots, there will still be a sixteen frame delay before the next transaction assignment (which will be made in response to a piggyback transaction request) can be made. Thus, if a large amount of data needs to be sent over this fast and otherwise unused inroute, seven out of every sixteen frames will be unused, thus making use of only about fifty-six percent of the inroute's potential maximum transmission rate.

SUMMARY OF THE INVENTION

The present invention advantageously addresses the needs above as well as other needs by providing for improved transaction processing in an Integrated Satellite Business Network.

In one embodiment, the invention can be characterized as a method of improved transaction reservation. The method includes generating a transmission request message indicating the number of slots needed to transmit a data message from a remote terminal via a spacelink to a host terminal. Next, the method includes transmitting the transaction request message from the remote terminal to the host terminal, and, within the host terminal, assigning one or more slots within an inroute frame to the remote terminal. The method then includes transmitting a transaction assignment message containing the number of slots assigned and which slots were assigned. In response to this assignment, the method includes transmitting at least a portion of the data message during the slots assigned.

In some variations of the above embodiment, transaction requests are queued by the host terminal. Such queuing includes storing the transaction request, when received by the host terminal, at the bottom of a queue. The assigning of slots, in this variation, includes retrieving the transaction request from the top of the queue, after other requests higher on the queue receive their slot assignments. Preferably, the number of slots assigned, which may be less than the number of slots requested, is subtracted from the transaction request after a slot assignment is made, and the transaction request is again stored on the bottom of the queue. This process is repeated until all of the slots requested in the transaction request message have been assigned by the host terminal, thus allowing the entire data message to be sent.

BRIEF DESCRIPTION OF THE DRAWINGS

The above and other aspects, features and advantages of the present invention will be more apparent from the following more particular description thereof, presented in conjunction with the following drawings wherein:

FIG. 1 is a schematic block diagram of an Integrated Satellite Business Network suitable for carrying out the teachings of one embodiment of the present invention;

FIG. 2 is a diagram illustrating the signals communicated between the components shown in FIG. 1 in order to request, receive and utilize transaction reservation slots in an inroute of the Integrated Satellite Business Network.

Corresponding reference characters indicate corresponding components throughout the several views of the drawings.

DETAILED DESCRIPTION OF THE INVENTION

Figure 1A:
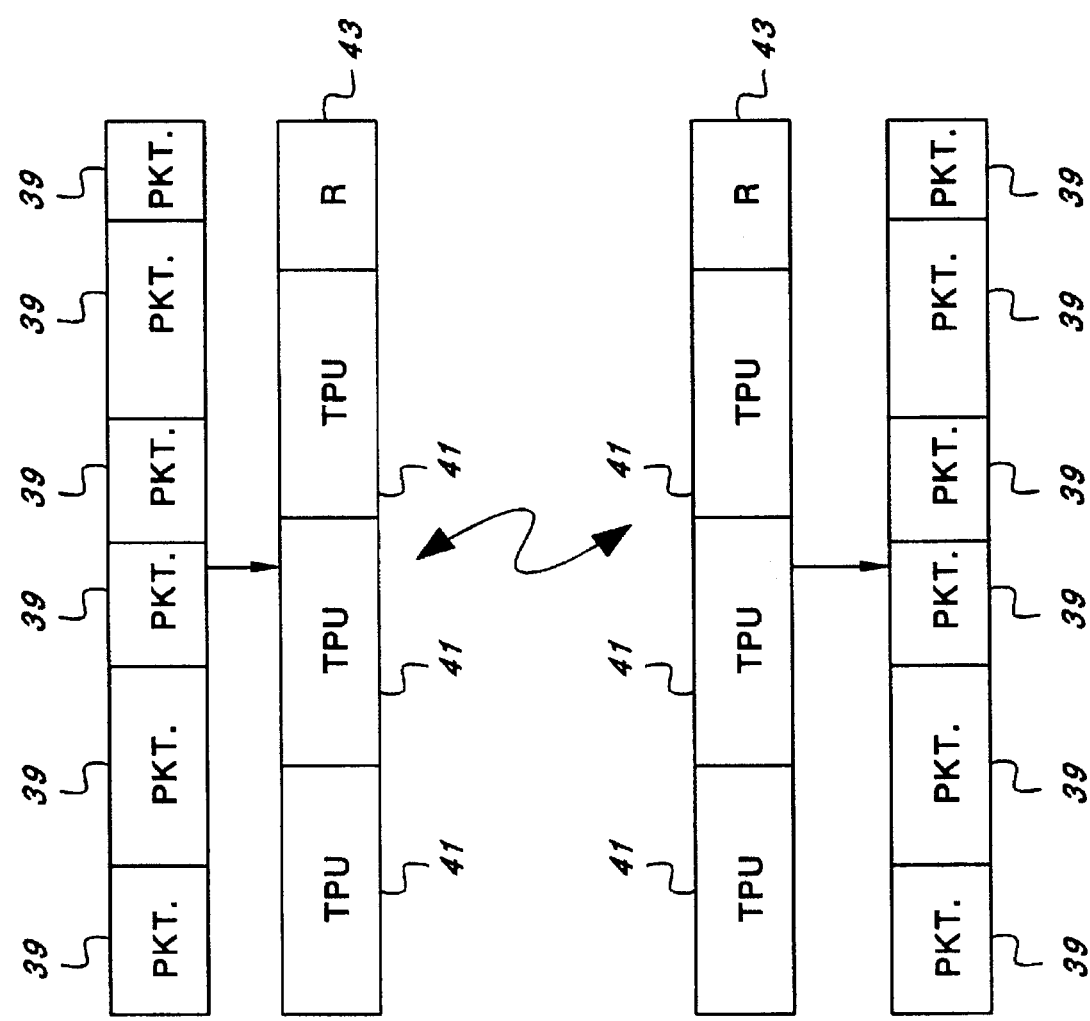
FIG. 1a is a diagram illustrating the repacking of irregularly sized packets into Transaction Processing Units, and the unpacking of Processing Units Processing Units in order to restore the packets, as performed by the Integrated Satellite Business Network of FIG. 1.

The following description of the presently contemplated best mode of practicing the invention is not to be taken in a limiting sense, but is made merely for the purpose of describing the general principles of the invention. The scope of the invention should be determined with reference to the claims.

Referring first to FIG. 1, a schematic block diagram is shown of an Integrated Satellite Business Network 10 (ISBN). A remote terminal 12 is coupled via airwaves to an earth orbit satellite 14, and the earth orbit satellite 14 is coupled via airwaves to a host terminal 16. The remote terminal 12 includes both a remote network interface 18 (or remote port card) and a user device 20. The user device 20 can be one of a number of possible user devices, e.g., a personal computer, a mini computer, a dumb terminal, or the like. The host terminal 16 consists of a host network interface 22 and a host device 24. The host device 24 can consist of, e.g., a main frame computer or the like.

The remote network interface 18 employs a satellite antenna 26 and suitable communications hardware (not shown), such as is commonly known in the art. In addition, the remote network interface 18 employs a number of subsystems, several of which are relevant to the present embodiment. First, an enhanced transaction processor 30, preferably implemented using control software modifying a processor within the remote network interface 18, is used to extract broadcast messages from the host terminal 16, and to pass information extracted from the broadcast messages along to other subsystems within the remote terminal 12. The enhanced transaction processor 30 is also used to send transaction requests, receive transaction assignments (i.e., bandwidth assignments) and send data packets. Second, an aloha processor 32, also implemented using the control software, is used to randomly select a burst within the number of bursts allocated to user aloha, or control aloha, in which an outgoing aloha message will be transmitted. Third, an Optimum Data Link Control 34 (ODLC), also implemented using the control software, ensures the sequential error free delivery of data packets from the remote terminal to the host terminal.

Within the host network interface 22, a number of subsystems also perform various functions relevant to the present embodiment. These subsystems are also preferably realized as a part of a software control system that modifies a processor within the host network interface 22. A Line Interface Module 36 (LIM) is used to interface to and perform processing for the host device. Another subsystem used in the host network interface is a Demand Assignment Processor 38 (DAP). The Demand Assignment Processor 38 controls the allocation of slots within each inroute frame, and, in accordance with the present embodiment, makes transaction reservation assignments once per frame for one frame at a time. (This is in contrast to heretofore used Demand Assignment Processors wherein a thirteen frame look-ahead is used to make frame assignments.) Every frame interval (every 45 ms) a frame that is ten frames in the future is processed by the Demand Assignment Processor 38 and transaction reservation slots are assigned in the form of bursts. The frame ten frames in the future is processed in order to allow time for the transaction reservation assignments to be sent to the remote terminals 12 before the packets assigned to the frame itself must be sent.

A network configuration parameter, Maximum Transaction Size, determines the maximum length of a data packet transmitted in the transaction reservation component. This parameter must be an even multiple of the number of bytes in an inroute slot, and less than or equal to 256 bytes, which is the maximum size of a packet transmittable through the spacelink. The term Transaction Packing Unit refers to a group of inroute slots holding exactly the number of bytes defined by the Maximum Transaction Size.

In accordance with the present embodiment, the Enhanced Transaction Processor 30 of the remote terminal assists in sizing all of the packets 39, see FIG. 1a, to be transmitted by the remote terminal into Transaction Packing Units 40 (FIG. 1a). The Enhanced Transaction Processor 30 receives packets 39 from the user device 20 in the order in which they are to be transmitted. The packets 39, which may initially be of irregular sizes, are packaged to fit exactly into Transaction Packing Units 41 by the Enhanced Transaction Processor 30. A residual number of slots 43 represents the number of slots remaining after all packets 39 are packaged into Transaction Packing Units 41 and residual slots 43.

Unlike in heretofore known Integrated Satellite Business Networks, the Enhanced Transaction Processor 30 of the present embodiment makes transaction requests for the total number of slots required to send these data packets. (As opposed to sending a stream of packet sizes as with prior methods.) The request, in slots, is a multiple of the Transaction Packing Unit 41, in length, plus residual slots 43 required to send any residual data left over after all packets 39 are packaged into Transaction Packing Units 41.

The Enhanced Transaction Processor 30 allocates slots, if configured by the network operator to do so, within the first Transaction Packing Unit for a piggyback transaction request message, packing the data packets to be sent into subsequent slots of the first Transaction Packing Unit accordingly. The piggyback transaction request requests a number of slots needed to transmit any Transaction Packing Units and any residual slots for which slots are not requested in the initial transaction request message (i.e., control aloha transaction request message). Thus, unlike in heretofore known Integrated Satellite Business Networks, piggyback requests do not affect inroute packing efficiency, because they are packaged into the Transaction Packing Units.

The Demand Assignment Processor 38 is able to handle up to fifty queued transaction requests, per inroute, and makes transaction reservation allocations in a round-robin fashion as described below. Thus, unlike heretofore used Demand Assignment Processors, which throw away transaction requests they cannot satisfy, the Demand Assignment Processor 38 of the present embodiment queues such requests, thus eliminating a significant amount of control aloha traffic. For each frame (each 45 ms), the Demand Assignment Processor 38 makes transaction reservation allocations based on the queued transaction requests. These allocations are made for a frame that is ten frames in the future (i.e., a frame being assigned), so that frame assignments have time to be transmitted back to the remote terminals before the remote terminals need to send packets during the assigned frame.

In practice, the Demand Assignment Processor 38 allocates the entire transaction reservation component of the frame being assigned (assuming the transaction request is large enough) to a transaction request on queue. The Demand Assignment Processor 38 allocates the entire transaction reservation component of the next frame being assigned (again assuming the transaction request is large enough) to the next transaction request on queue. If a transaction request on queue is not large enough to fill the entire transaction reservation component, then the Demand Assignment Processor 30 continues making allocations with the next transaction request on queue.

In order to notify the remote terminals having transaction reservations in an upcoming transaction reservation component of their reservations, the Demand Assignment Processor 38 sends a broadcast message to all remote terminals (unlike heretofore known methods wherein a point-to-point message is sent addressed to each remote terminal having transaction reservations). Each of the broadcast messages, which are sent once per frame, contains transaction reservation assignments (or transaction reservations) for each slot in a transaction reservation component of an upcoming inroute frame. In addition, each broadcast message contains the unique address of the remote terminal(s) receiving the assignment(s).

The Enhanced Transaction Processor 30 within each of the remote terminals awaiting transaction reservations parses the broadcast message, searching for transaction reservation assignments allocated to the remote terminal's unique address. The remote terminal(s) having the unique address(es) transmitted in the broadcast message respond by transmitting to the host terminal as many Transaction Packing Units or residual slots on queue as the remote terminal can fit into the assigned slots of the transaction reservation component.

To the extent that a queued transaction request is not fully satisfied on any given transaction reservation, the transaction request is placed back on the queue, waiting until it again reaches the top of the queue (i.e., until a round-robin queue pointer again points to this transaction request) where it will again be processed. Thus, the transaction requests are processed in a round-robin fashion with new transaction requests and not-fully-satisfied transaction requests being placed on the bottom of the queue, and the Demand Assignment Processor 38 servicing the transaction requests (to the extent possible in a single inroute frame) as they reach the top of the queue. As a result of this round-robin queuing structure of the present embodiment, it is not possible for a single remote terminal to lock-up the inroute as with heretofore used Integrated Satellite Business Networks.

After all of the transaction Processing Units 41, referring to FIG. 1a, and residual slots 43 associated with a particular data message are transmitted from the remote network interface 18 via the spacelink to the host network interface 22, the data message is reassembled by the host network interface 22 into the packets 39 that make up the data message. The host network interface 22 maintains the number of slots requested in the transaction request so that it can determine when all of the Transaction Processing Units 41 and residual slots 43 have been received by the host network interface.

Referring next to FIG. 2, a diagram is shown illustrating the signals communicated in the above-described Integrated Satellite Business Network between the user device, the remote network interface, the host network interface, and the host device. As described above, signals transmitted between the remote network interface and the host network interface are transmitted via the spacelink consisting of an air communications channel between the remote network interface 18 and the earth orbit satellite 14, the earth orbit satellite 14, and another air communications channel between the earth orbit satellite 18 and the host network interface.

As shown, four vertical lines 50, 52, 54, 56 represent the user device 20, the remote network interface 18 (remote port card), the host network interface 22 (or hub) and the host device 24, respectively. The earth orbit satellite 14 is also represented with signals being transmitted via airwaves from the remote network interface 18 to the earth orbit satellite 14 to the host network interface 22 and from the host network interface 22 via the earth orbit satellite 14 to the remote network interface 18.

When the user device 20 has a data message 58 that it needs to send to the host device 24, the user device transmits the data message 58 to the remote network interface 18. The transmission of the data message 58 from the user device 20 to the remote network interface 18 is accomplished through a serial port, token ring interface or ethernet interface.

Figure 3:
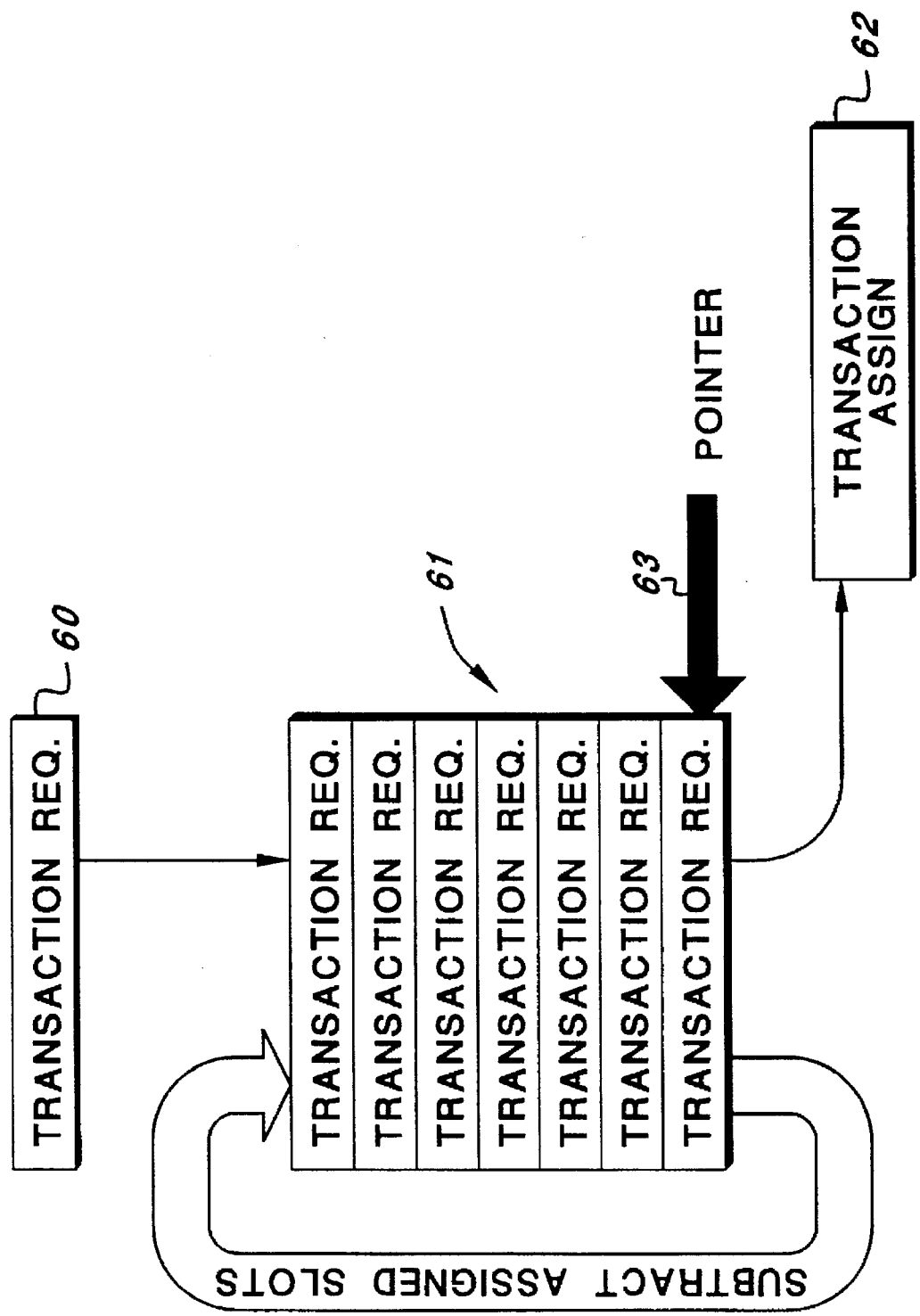
FIG. 3 is a schematic diagram showing the operation of a transaction request queue used in the requesting and receiving of transaction reservation slots as shown in FIG. 2.

Once the data message 58 arrives at the remote network interface 18, the remote network interface 18 (i.e., the Enhanced Transaction Processor 30 (FIG. 1) breaks the message into Transmission Packing Units, as described above. Next, the Enhanced Transaction Processor 30 (FIG. 1) within the remote network interface 18 determines the number of slots needed to transmit the Transaction Packing Units and the number residual slots. The determined number of slots is sent by the Enhanced Transaction Processor 30 (FIG. 1) of the remote network interface 18 via the spacelink to the Demand Assignment Processor 38 (FIG. 1) of the host network interface 22 in the form of transaction request message 60. The transaction request message 60, unlike in heretofore available Integrated Satellite Business Networks, contains a number of slots needed to transmit the entire data message (up to a maximum, such as 4095 slots for a 256 kbps inroute, 2047 slots for a 128 kpbs inroute, and 1023 slots for a 64 kpbs inroute) to the host network interface 22. It is not necessary to transmit the lengths of individual data packets to the remote network interface, because the message has been sized into Transmission Packing Units, as described above, by the remote network interface 18. The demand Assignment Processor 38 (FIG. 1) within the host network interface 18 receives the transaction request message 60 and queues the request on a round-robin queue 61, as shown in FIG. 3. When the transaction request 60 from the remote network interface 18 reaches the top of the queue 61, (i.e., when the round-robin queue pointer 63 points to the transaction request 60), and there are slots available in the frame being assigned, the host network interface 22 assigns all of the slots (assuming there are enough slots requested by the remote network interface) in the transaction reservation component to the remote network interface 18 having requested the slots. Once this assignment is made, the remaining slots (i.e., the initial transaction request minus the number of slots assigned) in the transaction request from the remote network interface 18 are queued to the bottom of the queue 61 and will again make their way toward the top of the queue 61 as other transaction requests on the queue are serviced. This queuing of transaction requests on a frame by frame basis, returning any unsatisfied transaction requests for slots to the bottom of the queue 61, is referred to herein as round-robin processing (or queuing) of transaction request queues. Those skilled in the art will recognize the queue shown in FIG. 3 as a circular linked list. Note that the "top" of the queue 61, as shown in FIG. 3, is shown closer to the bottom of FIG. 3 where the pointer 63 is located, and the "bottom" of the queue 61 is shown closer to the top of FIG. 3 where the initial transaction request 60 is queued.

Assignments for transaction reservation components are transmitted by the host network interface 22 to the remote network interface 18 via a broadcast message, referred to as a transaction assignment message 62. The transaction assignment message 62 is passed to all remote network interfaces monitoring the spacelink. Use of the transaction request message 62 (a broadcast message) is in contrast to heretofore available Integrated Satellite Business Networks, wherein a point-to-point message is used to transmit reservations assignments.

The transaction reservation assignment message 62 is received by the remote network interface 18 and the remote network interface 18 transmits a data packet 64 via the spacelink to the host network interface 22 during the assigned slots in the inroute frame. This data packet 62 may contain a piggyback transaction request message, as described above. In the event the remote network interface has additional requested slots queued from the initial transaction request, the remote network interface 18 then waits for an additional transaction assignment message 66 from the host network interface 22. This additional transaction assignment message 66, as mentioned above, will be broadcast from the host network interface 22 when the remote network interface's transaction request again reaches the top of the queue 61. The remote network interface 18 responds to this transaction assignment message 66 by transmitting another data packet(s) 68 during the assigned slots. This process of sending a transaction assignment message 62, 66, 70, 75, followed by data packet(s) 64, 68, 72, 76 is repeated until all of the slots requested in the initial transaction request message 60 (i.e., the control aloha transaction request message (CTR)) have been satisfied.

Following the satisfaction of the initial transaction request message 60, a transaction assignment message 78 is sent from the host network interface 22 for any queued transaction requests from any piggyback transaction request messages (ITR) 64. As with other transaction assignment messages 62, 66, 70, 74 the transaction assignment message 78 sent in response to the piggyback transaction request message 64 is responded to by the remote network interface 18 by the transmission of data packet(s) 80 in the assigned slots. After all data packets 64, 68, 72, 76, 80, i.e., all slots for the data message 58, have been transmitted to the host network interface 22 in response to transaction assignment messages 62, 66, 70, 74, 78, the host network interface 22, reassembles the data message 82 and transmits it to the host device 24. Such transmission is done, for example, through a serial port, token ring or ethernet interface, such as is commonly known in the art.

While the invention herein disclosed has been described by means of specific embodiments and applications thereof, numerous modifications and variations could be made thereto by those skilled in the art without departing from the scope of the invention set forth in the claims.

What is claimed is:

1. A method of improved transaction reservation in an integrated satellite network comprising:

generating a transaction request message in a requesting remote terminal from a group of remote terminals that contains information indicative of a number of slots needed to transmit a data message from the requesting remote terminal via a spacelink to a host terminal;

transmitting the transaction request message from the requesting remote terminal via the spacelink to the host terminal;

assigning, using the host terminal, one or more slots within an inroute to the requesting remote terminal;

transmitting a transaction assignment message that contains information indicative of a number of slots assigned and indicative of the one or more slots assigned from the host terminal via the spacelink to the group of remote terminals;

transmitting at least a portion of the data message during the one or more slots assigned from the requesting remote terminal via the spacelink to the host terminal;

queuing, after said transmitting of said transaction request message, a transaction request indicative of a number of slots needed to transmit said data message and of said requesting remote terminal having transmitted said transaction request message, the queuing including storing said transaction request at a bottom of a queue;

said assigning of said one or more slots including retrieving the transaction request from a top of said queue, and assigning said one or more slots in response to said transaction request; and subtracting the one or more slots assigned from the number of slots requested and, in the event the one or more slots assigned is less then the number of slots requested, altering said transaction request to indicate a difference between the one or more slots assigned and the number of slots requested; and requeuing said altered transaction request at a bottom of said queue.

2. The method of claim 1 further comprising:

assigning, using the host terminal, one or more additional slots within said inroute to said requesting remote terminal, including retrieving said altered transaction request from a top of said queue;

transmitting an additional transaction assignment message that contains information indicative of a number of additional slots assigned and indicative of the one or more additional slots assigned from the host terminal via the spacelink to the group of remote terminals; and transmitting at least a further portion of said data message during the one or more additional slots assigned from the requesting remote terminal via the spacelink to the host terminal.

3. A method of improved transaction reservation in an integrated satellite network comprising:

generating a transaction request message in a requesting remote terminal from a group of remote terminals that contains information indicative of a number of slots needed to transmit a data message from the requesting remote terminal via a spacelink to a host terminal;

transmitting the transaction request message from the requesting remote terminal via the spacelink to the host terminal;

assigning, using the host terminal, one or more slots within an inroute to the requesting remote terminal;

transmitting a transaction assignment message that contains information indicative of a number of slots assigned and indicative of the one or more slots assigned from the host terminal via the spacelink to the group of remote terminals;

transmitting at least a portion of the data message during the one or more slots assigned from the requesting remote terminal via the spacelink to the host terminal;

said transmitting of said transaction request message from the requesting remote terminal via the spacelink to the host terminal including transmitting said transaction request message in a slot, selected by said requesting remote terminal, within a control aloha component of said inroute;

said assigning, using the host terminal, including assigning at least one slot within said inroute for a piggyback request message; and transmitting, during at least one slot for said piggyback request message, said piggyback request message that contains information indicative of a number of additional slots, beyond those indicated in the transaction request message, needed to transmit said data message.

4. A method of improved transaction reservation in an integrated satellite network comprising:

receiving a data message into a remote network interface from a user device, the data message including a plurality of packets;

repackaging the plurality of packets into transaction packing units of a prescribed size and into residual slots;

generating a transaction request message that contains information indicative of an amount of bandwidth needed to transmit the data message from a remote network interface via a spacelink to a host network interface;

transmitting the transaction request message from the remote network interface via the spacelink to the host network interface;

assigning, using the host network interface, an amount of bandwidth within an inroute to the remote network interface;

transmitting a transaction assignment message that contains information indicative of an amount of bandwidth assigned from the host network interface via the spacelink to the remote network interface;

transmitting at least a portion of the data message during the bandwidth assigned from the remote network interface via the spacelink to the host network interface;

unpacking said transaction packing units and reassembling the data message; and transmitting the data message to a host device.

5. The method of claim 4 including:

said generating of said transaction request message including generating said transaction request message that contains information indicative of a number of slots needed to transmit said data message;

said assigning including assigning at least one slot within the inroute to the remote network interface;

said transmitting said transaction assignment message including transmitting said transaction assignment message that contains information indicative of a number of slots assigned; and said transmitting said at least said portion of said data message including transmitting said at least said portion of said data message during said slots assigned.

* * * * *